May 8, 1956 M. W. MARIEN 2,744,803
PISTON RINGS
Filed Aug. 9, 1952 4 Sheets-Sheet 1
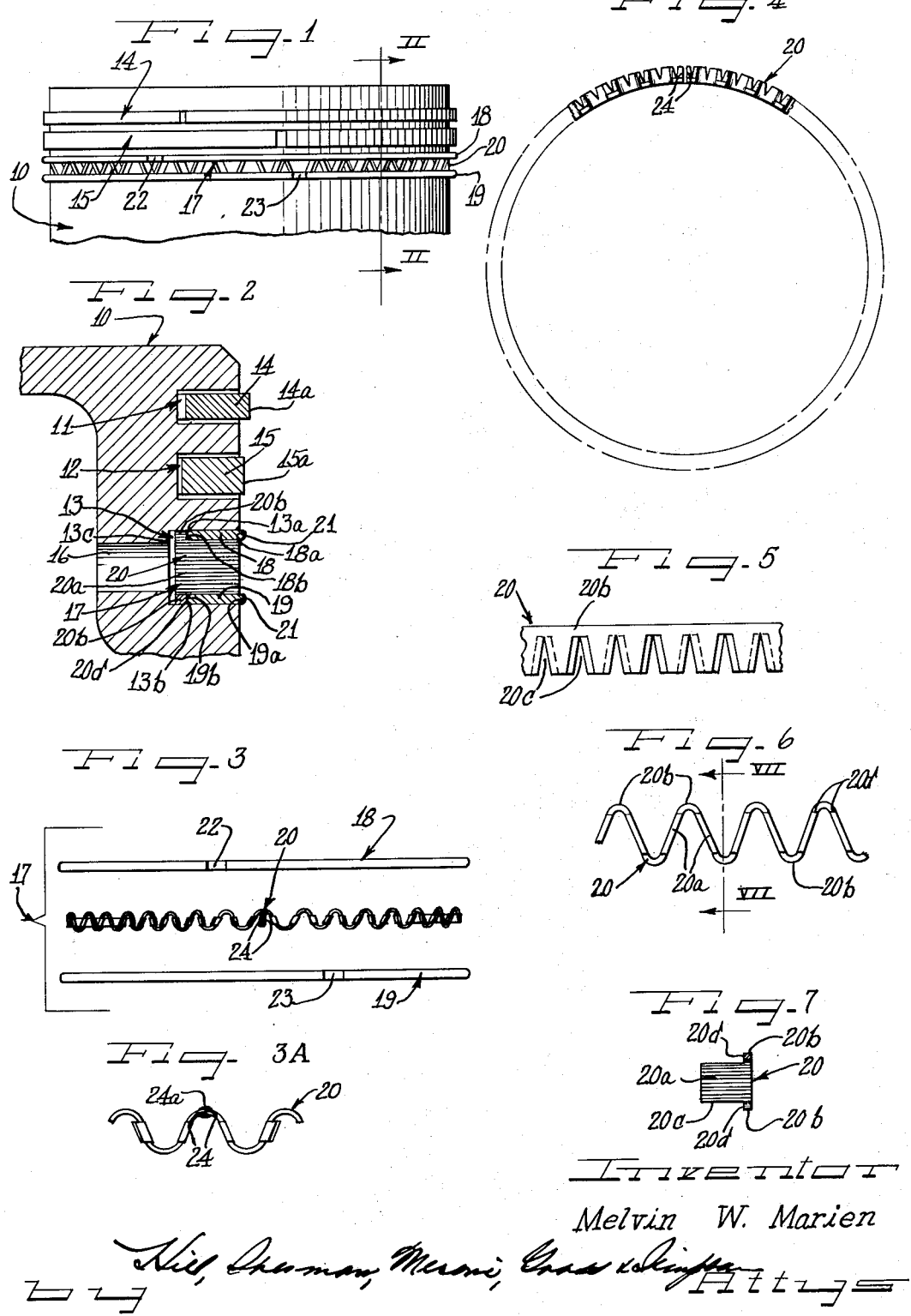
Inventor
Melvin W. Marien

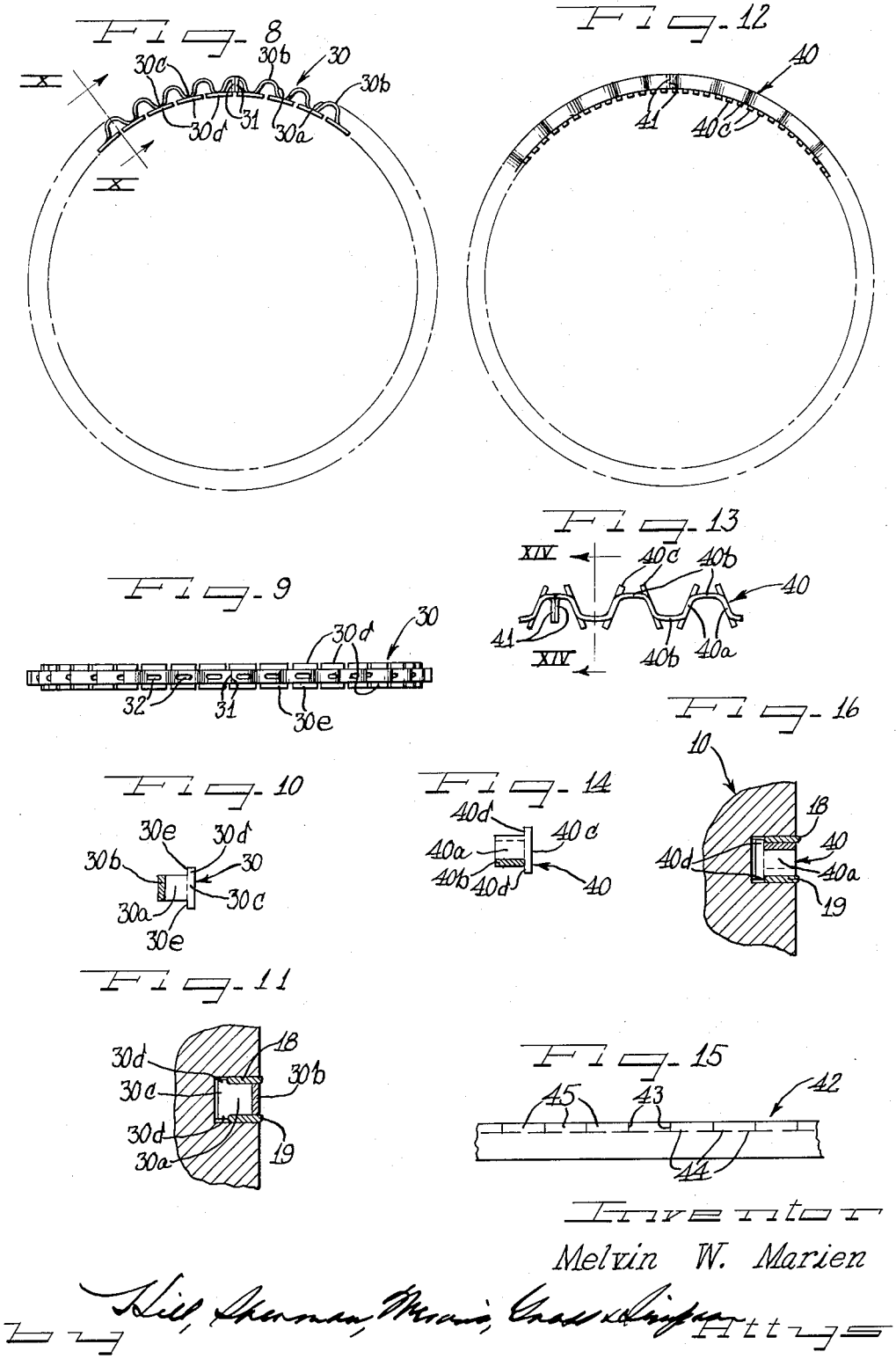

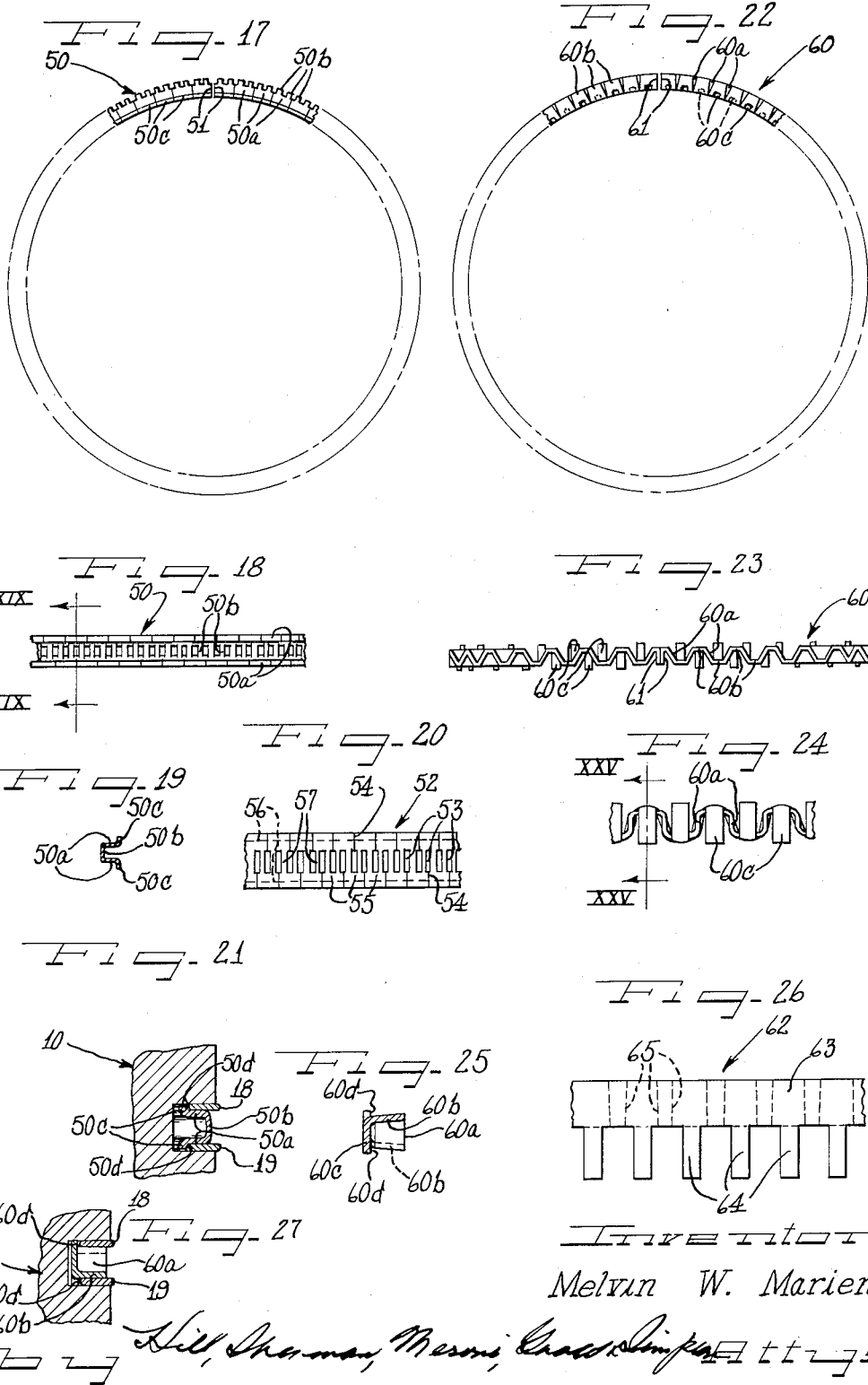

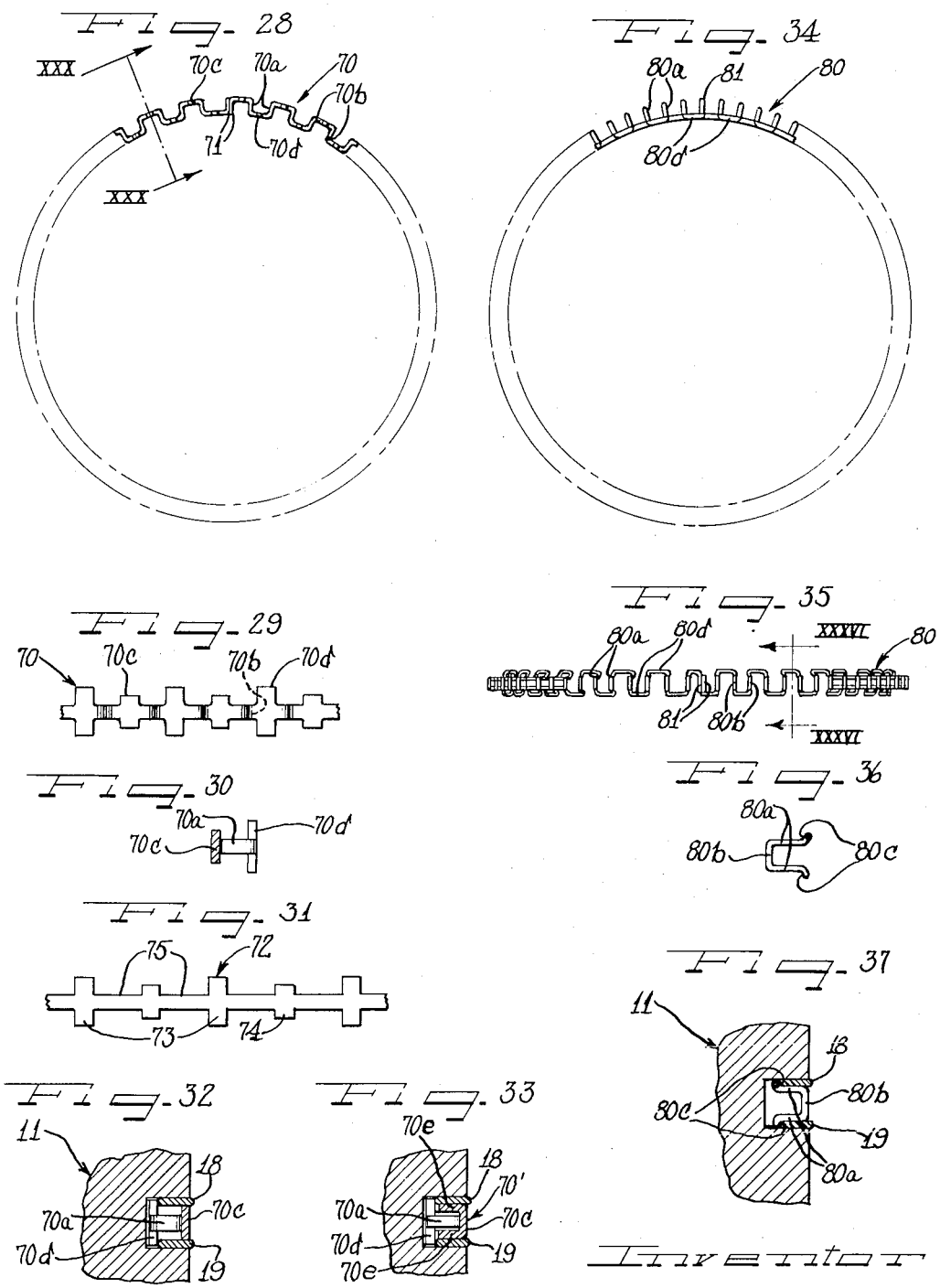

United States Patent Office 2,744,803
Patented May 8, 1956

2,744,803

PISTON RINGS

Melvin W. Marien, St. Louis, Mo., assignor to Ramsey Corporation, a corporation of Ohio Application August 9, 1952, Serial No. 303,465

5 Claims. (Cl. 309—45)

This invention relates to packing ring assemblies having cylinder wall engaging rings held in operative positions by a combination expander and spacer ring. Specifically, this invention deals with an oil control piston ring assembly having top and bottom flat thin ring segments or rails and a self-expanding open-type ring between and behind the thin rings or rails to space and expand the thin rings or rails.

This invention will hereinafter be specifically described as embodied in a piston ring assembly for pistons of internal combustion engines but it should be understood that the ring assemblies of this invention are generally useful as packing rings to control lubrication of relatively movable parts.

According to this invention there is provided a stack of rings including top and bottom flat thin steel ring segments and an intermediate combination expander and spacer ring. This intermediate ring extends between and behind the steel rings or rails and is a radially compressible self-expanding flexible sheet metal ring adapted to exert equal expansion loads around the entire circumference of each of the thin rings or rails. These rings or rails are preferably provided with chromium-plated rounded outer peripheries to present hard wear-resisting edges to the cylinder wall. The expander and spacer ring is preferably formed of thin steel strip stock or wire and is spring tempered. This ring has open spaces or apertures communicating with the oil vent holes in the piston for controlling drainage of oil between the two thin rings or rails.

An important feature of this invention resides in the provision of a single ring having the dual capacity of supporting the ring segments or rails in spaced operative position while at the same time radially expanding these rings against the cylinder wall. Another important feature of this invention is to provide an oil control piston ring assembly wherein separate ring segments are evenly loaded around their entire circumference by a separator ring.

It is then, an object of this invention to provide a packing ring having a plurality of thin flat sealing rings and a single circumferential expander spacer ring holding the thin rings in spaced relation while urging the rings radially outward around their entire periphery.

A further object of the invention is to provide a piston ring assembly especially adapted for the oil ring groove of pistons wherein a single spring ring acts as an expander and a spacer.

A still further object of the invention is to provide an oil control ring for internal combustion engine pistons wherein a one-piece radially expansible ring supports a plurality of sealing rings in spaced operative relation.

A further object of this invention is to provide an oil control ring for the oil grooves of internal combustion engine pistons which has a pair of spaced-opposed thin flat steel segment rings with outer peripheral edges having a hard wearable chromium plating thereon and with a spring metal corrugated ring extending between and behind the thin rings to support the same against the top and bottom side walls of the ring groove to seat their hard outer edges on a cylinder wall receiving the piston.

Other and further objects of this invention will become apparent to those skilled in the art from the following detailed descriptions of annexed sheets of drawings which, by way of preferred examples illustrate a number of different modifications of this invention.

On the drawings:

Figure 1 is a side elevational view of a piston equipped with an oil ring assembly of this invention.

Figure 2 is an enlarged fragmentary vertical cross-sectional view taken along the line II—II of Figure 1.

Figure 3 is an exploded elevational view of the oil groove piston ring assembly shown in Figures 1 and 2.

Figure 3A is a fragmentary enlarged elevational view showing the ends of the expander and spacer ring in welded together relation.

Figure 4 is a plan view of the combination expander and spacer ring in the assembly of Figure 3.

Figure 5 is an enlarged fragmentary plan view of the ring of Figure 4.

Figure 6 is a fragmentary enlarged peripheral view of the ring of Figures 4 and 5.

Figure 7 is a vertical cross-sectional view of the ring taken along the line VII—VII of Figure 6.

Figure 8 is a plan view of a first modified type of expander and spacer ring for the oil control ring assemblies of this invention.

Figure 9 is a side elevational view of the ring of Figure 8.

Figure 10 is a cross-sectional view of the ring taken along the line X—X of Figure 8.

Figure 11 is a fragmentary cross-sectional view of an oil groove ring assembly according to this invention using the ring of Figures 8 to 10.

Figure 12 is a plan view of a second modified form of expander and spacer ring for the oil control piston ring assemblies of this invention.

Figure 13 is an enlarged fragmentary side elevational view of the ring of Figure 12.

Figure 14 is a cross-sectional view of the ring of Figure 13 taken along the line XIV—XIV of Figure 13.

Figure 15 is a fragmentary plan view of a blank from which the ring of Figures 12 to 14 is formed.

Figure 16 is a view similar to Figure 11 but illustrating the assembly with the ring of Figures 12 to 14 therein.

Figure 17 is a plan view of a third modified form of expander and spacer ring for the oil control piston ring assemblies of this invention.

Figure 18 is a fragmentary outside peripheral side elevational view of the ring of Figure 17.

Figure 19 is a cross-sectional view of the ring of Figure 18 taken along the line XIX—XIX of Figure 18.

Figure 20 is a fragmentary plan view of a blank from which the ring in Figures 17 to 19 is formed.

Figure 21 is a view similar to Figure 11 but illustrating the assembly with the ring of Figures 17 to 20 therein.

Figure 22 is a plan view of a fourth modified form of expander and spacer ring for the oil control piston ring assemblies of this invention.

Figure 23 is an outside side elevational view of the ring of Figure 22.

Figure 24 is a fragmentary enlarged inside peripheral view of the ring of Figure 22.

Figure 25 is a transverse vertical cross-sectional view taken along the line XXV—XXV of Figure 24.

Figure 26 is a plan view of a strip of metal from which the ring of Figures 22 to 25 is formed.

Figure 27 is a view similar to Figure 11 but illustrating the assembly with the expansion and spacer ring of Figures 22 to 25 therein.

Figure 28 is a plan view of a fifth modification of expander and spacer ring for the oil control piston ring assemblies of this invention.

Figure 29 is a fragmentary outside peripheral view of the ring of Figure 28.

Figure 30 is a vertical cross-sectional view taken along the line XXX—XXX of Figure 28.

Figure 31 is a plan view of a strip of metal from which the ring of Figures 28 to 30 is formed.

Figure 32 is a view similar to Figure 11 illustrating the oil control piston ring assembly with the ring of Figures 28 to 30 therein.

Figure 33 is a view similar to Figures 11 and 32 illustrating the expander and spacer ring as having flat flanges on the upstanding portions thereof to underlie the opposing faces of the thin ring segments thus providing a sixth modification of the assembly.

Figure 34 is a plan view of a seventh modification of expander and spacer ring for the oil control piston ring assemblies of this invention.

Figure 35 is an outside peripheral view of the ring of Figure 34.

Figure 36 is a transverse cross-sectional view taken along the line XXXVI—XXXVI of Figure 35.

Figure 37 is a view similar to Figure 11 but showing the ring of Figures 34 to 36 in the assembly.

As shown on the drawings:

In Figures 1 and 2 the reference numeral 10 designates generally a piston for an internal combustion engine. The piston 10 is equipped with the conventional top ring groove 11, middle ring groove 12, and oil ring groove 13. A conventional split solid cast iron piston ring 14 is mounted in the top groove 11 to provide a compression seal. A conventional split compression ring 15 also of cast iron composition is seated in the middle groove 12. The rings 14 and 15 have broad cylinder wall engaging faces 14a and 15a respectively.

The oil ring groove 13 is wider than the grooves 11 and 12 and is joined through oil holes such as 16 with the interior of the piston. This groove 13 has a top wall 13a and a bottom wall 13b extending radially outward from a vertical back wall 13c which is pierced at intervals by the oil holes 16.

An oil control ring assembly 17 of the invention is mounted in the oil groove 13. This assembly 17 includes a top thin flat ring segment 18, an identical bottom ring segment 19 and an intermediate combination expander and spacer ring 20. The rings 18 and 19 have rounded outer peripheral edges 18a and 19a each covered with a layer of chromium or other hard corrosion and wear resisting metal 21 so that the cylinder wall engaging edges of each ring are reinforced with a hard coating. The coating can be applied by electro-plating, brazing or in any other suitable manner. The inner peripheral edges of the rings 18 and 19 are also rounded at 18b and 19b respectively but the inner peripheries are not coated with the hard metal.

As shown in Figure 3 the thin ring segments or rails 18 and 19 are split and gaps 22 and 23 are respectively provided between the ends of the ring. These gaps will vary in width as shown, even when the rings are in operation on the piston 10 as shown in Figure 1 to permit radial contraction and expansion of the thin rings.

The ring 20, on the other hand, has abutted together ends 24 as shown in Figure 3. This ring 20 when radially compressed will contract with a resilient spring-like action to exert an equal outward radial load around its entire periphery.

Alternately, as shown in Figure 3A, the ends of the ring 20 can be welded together as at 24a thereby avoiding any possible installation difficulties arising from improper abutment of the ends. The continuous ring 20 thus formed can be easily stretched over the head of the piston 10 to snap into the groove 13. Suitable lock joints or connectors could also be used to secure together the ends 24 of the ring 20.

As shown in Figures 4 to 7, the ring 20 is corrugated in a vertical plane to provide inclined legs 20a joined at their tops and bottoms by rounded loops 20b. These loops 20b, however, are slotted inwardly from the outer periphery of the ring at 20c so that the loops 20b remain only at the inner periphery of the ring. The slots 20c are in effect cut out from the outer peripheral portions of the loops and shoulders 20d are thereby formed at the back ends of the slots. These shoulders 20d form abutments for the inner peripheral edges 18b and 19b of the thin ring segments 18 and 19 as shown in Figure 2 while the legs 20a lie between the thin rings to support them against the top and bottom walls 13a and 13b respectively of the ring groove 13.

Thus, the ring 20 exerts its expanding load simultaneously on both thin rings 18 and 19 and at the same time separates these rings to hold them against the top and bottom faces of the ring groove. The convolutions or legs 20a of the ring 20 are separated around the periphery of the ring 20 so that the space between the rings 18 and 19 is in full communication with the oil drain holes 16 communicating with the back wall 13c of the ring groove.

The ring groove 13 can be of any desired depth since the ring 20 need not be bottomed on the groove in order to exert its expanding force. Thus, as shown in Figure 2 the inner periphery of the ring 20 is actually spaced radially outward from the back wall 13c of the ring groove 13. Yet the ring by being under inherent radial compressive load will exert its expanding force on the ring segments 18 and 19. In the ring 20 the convolutions are in a vertical plane.

Similar results can be obtained from the ring shown in Figures 8 to 11 where the convolutions are in a radial plane. As shown in these figures the ring 30 is a split ring which has abutted together end edges 31. The ring 30 has a plurality of corrugations extending in a radial plane with sloping side legs 30a connected at their radial outer ends with loops 30b and at their inner ends with loops 30c. However, the loops 30c each have upstanding tabs 30d above and below the top and bottom edges of the legs 30a and the loops 30b. These tabs 30d extend laterally of the loops 30c to provide circumferential segments each of which forms a shoulder 30e at the top and bottom of each leg 30a. These shoulders 30e receive the inner peripheral edges of the thin ring segments 18 and 19 thereagainst as illustrated in Figure 11.

The ring 30, like the ring 20 will, therefore, provide a separator and an expander for the rings 18 and 19 to receive the ring on the legs 30a and loops 30b thereof and to have the shoulders 30e urge the rings radially outward. The ring 30, also like the ring 20, is radially compressible by flexing of the corrugations so that it will exert its radial load on the ring segments without the necessity of being bottomed on the bottom of the ring groove.

To increase the capacity for drainage of oil from the space between the rings 18 and 19 in the ring groove of the piston, the loops 30c are preferably slotted as shown at 32. Oil can thereby drain through the slots 32 as well as through the spaces between the tabs 30d.

In the second modification shown in Figures 12 to 16 a separator and expander ring 40 is provided with corrugations extending in a vertical plane and having abutting ends 41 providing a closed ring. The corrugations or convolutions include legs 40a sloping in a vertical plane and connected at their top and bottom ends by loops 40b. The legs 40a and the loops 40b extend radially of the ring groove from tab portions 40c formed on the inner peripheral ends of the legs 40a and projecting beyond the top and bottom of the loops 40b to provide shoulders 40d at the inner ends of the legs which shoulders project above and below the loops. These shoulders 40d form abutments for the inner edges of the ring segments 18 and 19 as shown in Figure 16 while the legs 40a extend between the rings to form separators with the rings resting on the loops 40b.

As shown in Figure 15 the ring 40 is formed from flat strip stock 42 which is slit inwardly from one edge at intervals to provide cuts 43 to form the terminal ends for the tabs 40c. The strip is also slit parallel to an edge to provide cuts 44 which intersect the cuts 43 and, therefore, separate the outer ends of the tabs from the loops. The strip is then corrugated to provide the legs 40a and the connecting loops 40b while the tab blank portions 45 remain flat.

Therefore, in this second modification, vertical corrugations similar to those provided in the ring 20 are used and the abutment shoulders are formed from tabs on the inner periphery of the ring.

In the third modification shown in Figures 17 to 21, a ring 50 provides the expansion and separating properties similar to the ring 20. The ring 50 has a U-shaped cross-section with outturned flanges on the top and bottom legs thereof. This ring 50 has abutted together end edges 51 so as to provide a continuous ring. The ring is formed with top and bottom segments 50a joined by spaced legs 50b. As shown in Figure 18 one leg of a top segment is connected to an offset bottom segment so that the next leg on this bottom segment is connected to a top segment which joins the first mentioned top segment. The segments are slightly separated so that the legs provide springs which permit radial expansion and contraction of the ring to move the segments toward and away from each other. Each segment 50a has an outturned flange 50c thereon so that, as shown in Figure 21, shoulders 50d are provided for abutting the inner peripheral edges of the ring segments 18 and 19 while the segments 50a support the ring segments 18 and 19 against the top and bottom side walls of the ring groove in the piston 10. The bottom of the ring groove is in full communication with the space between the ring segments 18 and 19 by virtue of the spaces or slots between the connecting legs 50b of the ring 50.

It should be understood then that the ring 50, like the ring 20, serves as its own spring to not only expand the thin ring segments 18 and 19 but to also hold these segments in proper operating position against the side walls of the ring groove. Like the ring 20, the ring 50 does not depend upon the bottom wall of the ring groove for support. The ring 50 is conveniently formed from flat strip stock 52 shown in Figure 20. As therein shown the flat ribbon of steel has rectangular cut out portions 53 in the center thereof and opposite edges of adjacent cut out portions are connected by slits 54 to the outer edges of the strip. These slits 54 provide the crown blanks or segments 55 which form the top and bottom segments 50a of the finished ring. As shown by the dotted line 56 the segments 55 are bent to form the flanges 50d on the segments 50a. The legs between the slots 53 form the legs 50d of the finished ring.

In the fourth modification shown in Figures 22 to 27, the combination expander and separator ring 60 has vertical or axially extending corrugations on convolutions with abutted together end edges 61 to provide a continuous ring. The convolutions include sloping legs 60a connected by flat top and bottom portions 60b thereby forming radial extending segments at the top and bottom of the legs. Tabs 60c are formed at the radial inner edges of the flat portions 60b. These tabs extend alternately upwardly and downwardly from the top and bottom portions 60b so as to provide upstanding legs around the inner periphery of the ring. These legs project alternately above and below the portions 60b so as to provide abutment shoulders 60d receiving the ring segments 18 and 19 thereagainst. The sloping legs 60a extend between the ring segments while the flat portions 60b form supports for the ring segments. The ring can be radially compressed to form a loaded expansion unit since the legs 60a will flex to permit expansion and contraction of the segments 60a. The ring 60 thus functions in a similar manner to ring 20. As shown in Figure 26, the ring 60 is conveniently formed from a flat ribbon 62 of spring steel having a main body portion 63 with laterally projecting legs 64 at spaced intervals along one edge thereof. The legs 64 form the tabs 60c while the main body is corrugated by being bent along the dotted lines 65 to provide the sloping legs 60a and the connecting legs 60b.

In the fifth modification shown in Figures 28 to 32, the ring 70 is corrugated in a radial plane and has abutted together edges 71 forming a continuous ring. The corrugations have radially extending legs 70a connected at their inner and outer ends by loops 70b. The loops 70b have upstanding fingers thereon, the outer loops 70b having short fingers 70c and the inner loops 70b having longer fingers 70d as best shown in Figure 29. The short fingers 70c formed around the outer periphery of the ring, as shown in Figure 30 extend between the ring segments 18 and 19 adjacent the outer peripheries thereof to separate these segments while the long fingers 70d extend behind the inner peripheries of the ring segments to act thereagainst for expanding the ring segments. It will be noted from Figure 32 that the legs 70a are quite narrow and it will also be noted from Figure 28 that the legs 70a and 70b are separated so that the space between the rings 18 and 19 is in full communication with the bottom of the ring groove in the piston 11 and free drainage of oil is permitted.

As shown in Figure 31 the ring 70 is conveniently formed from a flat strip of steel 72 which has long transverse fingers 73 alternating with short transverse fingers 74 at spaced intervals along the length thereof. These fingers 73 and 74 are connected by relatively narrow longitudinal strip portions 75. The strip portions 75 are corrugated to form the legs 70a and the connecting legs 70b. The ring 70 thus functions in the same manner as ring 20.

The sixth embodiment shown in Figure 33 is a separating and expansion ring 70' identical with the ring 70 except for the addition of supporting flanges on the legs 70c. As shown the ring 70' has the upstanding outer fingers 70c, the upstanding inner fingers 70d forming shoulders for the rings 18 and 19 and a convolution leg 70a. However, the fingers 70c are equipped with inturned flanges 70e for underlying the rings 18 and 19 to provide longer supports for the rings. It will be understood, therefore, that the ring 70' is identical with the ring 70 and is formed in the same identical way except that the fingers 70c are provided with the inturned flanges 70e.

In the seventh embodiment shown in Figures 34 to 37 a wire ring 80 is provided for the expansion and separator ring of the assembly. This ring 80 has abutting end edges 81 forming a continuous ring. The ring 80 is composed of wire of circular cross section bent to provide upstanding U-shaped segments alternately connected at their top and bottom ends to form a spring which will develop its own radial expansion force without being bottomed on the ring groove. As shown, the ring 80 has radially spaced top and bottom parallel legs 80a with axial or vertically extending bight portions or legs 80b joining the legs 80a at their outer periphery. Each leg 80a is outturned at its inner edge to provide shoulders 80c and the offset wire portions then form connecting legs 80d joining the inner ends of the legs 80a. As shown in Figure 37, the bight portions 80b extend between the rings 18 and 19, the top and bottom legs 80a underlie these rings to support them, and the shoulders 80c abut the inner peripheries of the rings to urge them radially outward. The wire spring thus developed separates the thin ring segments 18 and 19 and holds them against the top and bottom side walls of the ring groove while at the same time urging the ring segments radially outward against the cylinder wall in which the piston 11 operates.

From the above description it will, therefore, be understood that this invention provides a packing ring assembly wherein sealing rings are urged radially outward and are held in separated relation by a self-expanding spring ring which does not depend upon engagement with a ring groove to exert its expanding force on the sealing rings. The self-expanding ring thus serves a dual function of an expander and a separator in a packing ring assembly. The combination expanding and separator ring is open around its periphery so as not to impede free drainage of oil in oil ring assemblies. The ring can be made continuous by welding or otherwise securing the ends together and the resulting complete annulus can be stretched over the head of the piston and snapped into the oil ring groove.

I claim as my invention:

1. A combined expansion and spacer ring for packing ring assemblies which comprises a spring metal ring formed from a strip having continuous parallel edges and having its ends welded together and having axially extending convolutions providing top and bottom supporting surfaces and sloping legs connecting said surfaces, and said top and bottom surfaces being recessed inwardly from the outer periphery thereof through the thickness of the strip and separating adjacent legs, the terminal ends of said slots providing abutment shoulders adjacent the inner periphery of the ring.

2. A combined spacer and expansion ring for packing ring assemblies which comprises an axially corrugated spring metal ring having sloping legs connected at the tops and bottoms thereof by loops, said loops having recesses cut through the thickness of the ring inwardly from the outer periphery of the ring terminating in spaced relation from the inner periphery of the ring for providing flat supporting surfaces on upper and lower edges of the legs, and the uncut portion of said loops providing abutment shoulders adjacent the inner periphery of the ring.

3. An expander-spacer device for packing ring assemblies comprising a ring of resilient material, said ring having vertical corrugations therein whereby said ring is peripherally expansible and contractable and having a plurality of spaced vertically sloping rail ring supporting legs radially extending from said ring.

4. An expander-spacer device for packing ring assemblies comprising a ring of resilient material, said ring having vertical corrugations therein whereby said ring is peripherally expansible and contractable and having a plurality of spaced vertically sloping rail ring supporting legs radially extending from said ring, said legs having substantially aligned upper and lower edges disposed axially inwardly from the upper and lower extremities of said ring.

5. A combined expansion and spacer ring for packing ring assemblies which comprises a spring metal ring formed from a strip having continuous parallel edges and having axially extending convolutions and a plurality of sloping legs having top and bottom surfaces, and said top and bottom surfaces of adjacent legs being spaced by recesses extending inwardly from the outer periphery of the ring, the terminal ends of said recesses providing abutment shoulders adjacent the inner periphery of the ring.

References Cited in the file of this patent

UNITED STATES PATENTS

| | | |
|---|---|---|
| 1,473,446 | Scott | Nov. 6, 1923 |
| 2,252,199 | Phillips | Aug. 12, 1941 |
| 2,293,450 | Wilkening | Aug. 18, 1942 |
| 2,346,899 | Bowers | Apr. 18, 1944 |
| 2,390,044 | Bowers | Dec. 4, 1945 |
| 2,436,896 | Mummert et al. | Mar. 2, 1948 |
| 2,565,042 | Phillips | Aug. 21, 1951 |
| 2,635,022 | Shirk | Apr. 14, 1953 |

FOREIGN PATENTS

| | | |
|---|---|---|
| 555,348 | Great Britain | Aug. 18, 1943 |